Dec. 1, 1970          F. E. WATKINS          3,543,579
TURBINE FLOW METER
Filed Jan. 10, 1969
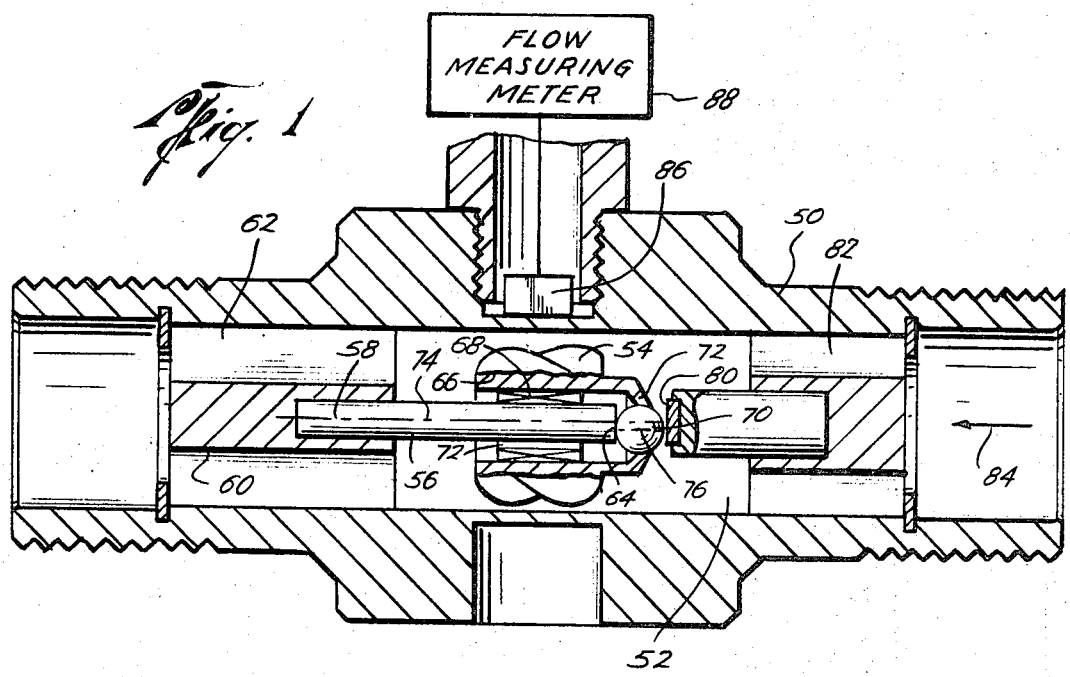
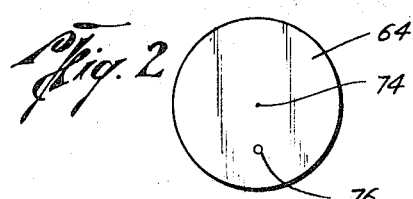
PRIOR ART
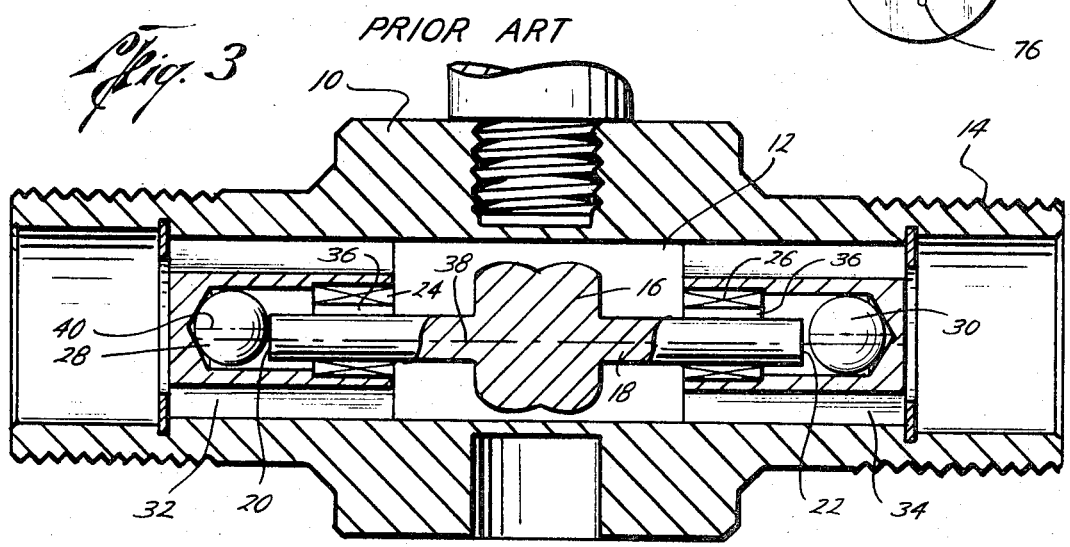
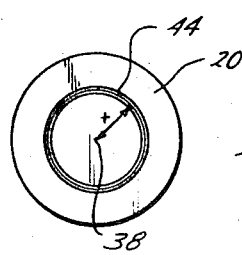
Fred E. Watkins
INVENTOR.
BY
ATTORNEYS United States Patent Office 3,543,579
Patented Dec. 1, 1970

3,543,579
TURBINE FLOW METER
Fred E. Watkins, Houston, Tex., assignor to Camco, Incorporated, Houston, Tex., a corporation of Texas
Filed Jan. 10, 1969, Ser. No. 790,205
Int. Cl. G01f 1/00
U.S. Cl. 73—231      5 Claims

ABSTRACT OF THE DISCLOSURE

A turbine flow meter in which the turbine wheel is supported from a cantilevered supporting shaft, one end of which is fixedly secured, and the turbine wheel is rotatably supported from the second end of the shaft on a bearing and a thrust ball is positioned against the second end of the shaft and supported from the turbine wheel on the axis of the wheel. A thrust support fixedly secured in the housing and axially aligned therein and positioned adjacent and thrust bearing opposite the second end of the wheel supporting shaft. Straightening vanes on each side of the wheel supporting the supporting shaft on one side of the wheel and supporting the thrust support on the second side of the wheel.

BACKGROUND OF THE INVENTION

Generally, turbine wheels in flow meters are mounted on a rotating shaft in which each end of the shaft is separately supported by rotatable bushing and thrust bearings such as Patent No. 3,164,020. This method of turbine wheel support requires accurate alignment of both shaft end supports with the attendant complexity and expense in both manufacturing and servicing. In addition, misalignment of shaft ends requires an increase in shaft bearing clearances with a consequential reduction in stability and an increase in thrust friction.

SUMMARY

The present invention is directed to providing a turbine wheel supporting shaft which is fixedly secured at one end and axially aligned in the housing with the second end cantilevered and supporting a bushing which in turn rotatably supports the wheel and with a thrust ball positioned against the second end of the wheel supporting shaft and supported from the turbine wheel and axially aligned with the turbine wheel.

A further object of the present invention is the provision of a turbine flow meter for measuring two-way flow in which the turbine wheel is rotatably supported on a bearing from a cantilevered supporting shaft fixedly secured at one end and aligned in the housing and a thrust support is fixedly secured in the housing and axially aligned adjacent the free end of the supporting shaft with a thrust bearing positioned between the free end of the supporting shaft and the thrust support and supported from the turbine wheel thereby facilitating manufacturing and alignment of the turbine wheel and allowing the shaft sleeve bushing clearance to be reduced to a precision fit to increase the rotational stability of the turbine wheel.

BRIEF DESCRIPTION OF THE DRAWING

FIG. 1 is a cross-sectional view of the apparatus of the present invention,

FIG. 2 is an enlarged end view of the shaft indicating contact of the thrust bearing against the shaft of the apparatus of FIG. 1, FIG. 3 is a cross-sectional view of the apparatus illustrating prior art, and FIG. 4 is an enlarged end view of the shaft wear of the apparatus of FIG. 3.

DESCRIPTION OF THE PREFERRED EMBODIMENT

Referring now to FIG. 3, a prior art type of turbine flow meter is generally indicated which includes a tubular housing 10 having a bore 12 and is adapted to be connected in a flow line by threads 14 at either end, and includes a turbine wheel 16 positioned in said bore 12 for being rotated by the fluid flowing through the bore 12 and in which the speed of rotation is proportional to and is a measure of the flow rate of the fluid passing through the housing 10.

It is to be noted that the turbine wheel 16 is mounted on a rotating shaft 18 in which each end 20 and 22 is rotatably supported in a bushing 24 and 26, respectively, and against thrust bearings 28 and 30, respectively, in supports 32 and 34. Obviously, the bearings and support at the ends 20 and 22 of shaft 18 are required to be in alignment with each other thereby increasing the manufacturing and maintenance costs. Because of the difficulty of alignment of the ends of the shaft 18 the clearances 36 between the bushings 24 and 26 with the shaft ends 20 and 22, here shown as exaggerated for purposes of illustration, must be sufficiently large to allow alignment of the ends of the shaft 18 in the bushings. Of course, any increase in clearances 36 reduces the stability of the turbine wheel 16 and reduces the life of the bushings 24 and 26, the thrust bearings 28 and 30 and the shaft 18.

And generally the center line 38 of the shaft 18, because of the bearing clearances 36, will be offset from the center line 40 of the thrust bearings 20 and 30. Referring now to FIG. 4, even though the thrust bearings 28 and 30 have a point contact against the ends 20 and 22 of the shaft 18, the point of contact, for example of thrust bearing 28, will make a track 44 about the end 20 of shaft 18 offset from the center line 38 of shaft 18 by a distance $x$. Thus the moment resisting rotation of the shaft 18 equals the force of resistance times the moment arm $x$ or $M_r$ equals $F_r x$ where $M_r$ is the moment of resistance and $F_r$ is the force of resistance.

Referring now to the present invention, as illustrated in FIG. 1, the turbine flow meter includes a tubular housing 50 having a bore 52 through which the fluid to be measured flows, a turbine wheel 54 for rotating in response to fluid flow for measuring the flow rate. A turbine wheel supporting shaft 56 is provided with a first end fixedly secured in a support 60, preferably from straightening vanes 62. The supporting shaft 56 has a second end 64 which is cantilevered outwardly from the first end 58 and is axially aligned in the housing 50.

The turbine wheel 54 includes a hub 66 which is rotatably supported from the second end 64 of the shaft 56 by a sleeve bushing 68. An arcuate thrust member or bearing 70 is supported from the hub 66 by a cage 72 and the center line of the bearing 70 is aligned on the axis of the turbine wheel 54. The thrust ball is positioned for a point contact 75 against the second end 54 of the shaft 56.

Thus the turbine wheel 54, sleeve bushing 68 and thrust bearing 70 are supported on a single shaft end 64 which facilitates manufacturing, assembly and maintenance as the moving parts are only required to be aligned on a single shaft end 64 instead of requiring alignment of two shaft ends as shown in FIG. 3.

And a sleeve bushing clearance 72, here shown as exaggerated, contrary to the structure of FIG. 3, will not prevent the thrust forces from acting through a single point contact. That is, assuming that the center line 74 of the shaft 56 is offset from the center line 76 of the thrust bearing 70, because of the clearance 72 of the sleeve bushing 68, the thrust bearing 70 will rotate with the turbine wheel 64 with the center line of the ball 70 at the center line of the turbine wheel and the thrust forces will always be through the center line 75 at a point contact, as best seen in FIG. 2. This structure results in a lower thrust friction as compared with the conventional arrangement of FIG. 2 as there is no moment arm as the rotation is about point 75. This resulting lower thrust friction is particularly important at lower turbine speeds and flow rates.

In addition, since the turbine wheel 54 with the bushing 68 and thrust bearing 70 are rotatably supported on a single shaft end 64, eliminating the necessity of alignment of two shaft ends as required in FIG. 3, the alignment problem is not critical. This allows the bushing clearance 72 to be reduced to a precision degree thereby maintaining a close alignment of the rotating parts and provides a high degree of rotational stability of the turbine wheel through all ranges of speed, and additionally increases measurement linearity and greatly extends the life of the bushing 68, the thrust bearing 70 and the shaft 56.

In the event that the flow through the flowmeter 50 is to be measured in both directions, a thrust support 80 may be provided adjacent the thrust bearing 70 on the side opposite the end 64 of shaft 56 and supported from a fixed support such as the upstream straightening vanes 82. Again, since the thrust bearing rotates with the turbine wheel 54 and the center line 76 of the thrust bearing is located at the center line of the turbine wheel, the position of thrust support 80 is not critical and the thrust bearing 70 will operate with a point contact on the thrust support 80 similar to its action on the end 64 of support 56. Of course, if the flow through the turbine meter 50 is only in the direction as indicated by the arrow 84, the thrust support 80 may be omitted. Preferably, the sleeve bushing 68, the thrust bearing 70, shaft 56 and thrust support 80 are of tungsten carbide to provide low wear.

The turbine wheel 54, as is conventional, is made of magnetic material and a conventional magnetic pick up 86 is provided to generate an alternating signal which is fed into electronics 88 where the flow rate and/or totalized flow is measured.

The present invention is therefore well adapted and suited to attain the objects and has the advantages and features mentioned as well as others inherent therein.

What is claimed is:
1. A turbine flowmeter comprising,
a tubular housing through which the fluid to be measured flows,
a turbine wheel positioned in said housing for rotating in proportion to the flow rate of the fluid through the housing,
a turbine wheel supporting shaft fixedly secured at one end and axially aligned in the housing with said second end cantilevered and adapted to extend upstream,
a bushing surrounding the second end of the shaft and rotatably supporting said wheel,
an arcuate thrust member positioned against the second end of the wheel supporting shaft and supported from and aligned on the axis of the turbine wheel.
2. The apparatus of claim 1 including, straightening vanes downstream from the wheel supporting said supporting shaft one end.
3. A turbine flowmeter comprising,
a tubular housing through which the fluid to be measured flows,
a turbine wheel positioned in said housing for rotating in proportion to the flow rate of the fluid through the housing,
a turbine wheel supporting shaft fixedly secured at one end and axially aligned in the housing with the second end cantilevering therefrom,
a sleeve bushing surrounding the second end of the shaft and rotatably supporting the turbine wheel,
a thrust support fixedly secured in the housing and axially aligned and adjacent the second end of the supporting shaft,
a thrust bearing positioned between the second end of the wheel supporting shaft and said thrust support and supported from the turbine wheel.
4. The apparatus of claim 3 including,
straightening vanes on one side of the wheel supporting said supporting shaft one end, and
straightening vanes on the second side of the wheel supporting said thrust support.
5. The apparatus of claim 3 wherein the thrust bearing is aligned on the axis of the turbine wheel.

References Cited
UNITED STATES PATENTS 3,342,070  9/1967  Walch _____ 73—231

JAMES J. GILL, Primary Examiner

M. SMOLLAR, Assistant Examiner